United States Patent [19]
Holtey et al.
[11] 3,728,690
[45] Apr. 17, 1973

[54] BRANCH FACILITY DIAGNOSTICS

[75] Inventors: Thomas O. Holtey, Newton Lower Falls; Donald J. Greenwald, Brookline, both of Mass.
[73] Assignee: Honeywell Information Systems Inc., Waltham, Mass.

[22] Filed: Aug. 26, 1971
[21] Appl. No.: 175,266

[52] U.S. Cl. ... 340/172.5
[51] Int. Cl. ... G06f 11/04
[58] Field of Search ... 340/172.5

[56] References Cited

UNITED STATES PATENTS

| | | | |
|---|---|---|---|
| 3,560,933 | 2/1971 | Schwartz | 340/172.5 |
| 3,343,141 | 9/1967 | Hackl | 340/172.5 |
| 3,391,394 | 7/1968 | Ottaway et al. | 340/172.5 |
| 3,518,413 | 6/1970 | Holtey | 340/172.5 |

*Primary Examiner*—Gareth D. Shaw
*Attorney*—Ronald T. Reiling et al.

[57] ABSTRACT

Diagnostic hardware and a method for diagnosis and confidence testing of ROM branching capabilities. Logical circuitry including an RIT flip-flop, which when set modifies the operation of a halt "HLT" micro-op which normally stops the clock, so that the halt "HLT" micro-op will not stop the clock and its absence or the presence of any other micro-op will stop the clock. Execution of any of a predetermined set of branch micro-instructions to predetermined memory locations, sets the RIT flip-flop and causes a branch to a location containing a "HLT." If branching operates properly, the program continues; if not the machine halts, thus identifying the error and avoiding loss of control of the machine.

21 Claims, 8 Drawing Figures

INVENTORS
THOMAS O. HOLTEY
DONALD J. GREENWALD
BY Nicholas Prasinos
ATTORNEY

INVENTORS
THOMAS O. HOLTEY
DONALD J. GREENWALD
BY Nicholas Prasinos
ATTORNEY

INVENTORS
THOMAS O. HOLTEY
DONALD J. GREENWALD
BY [signature]
ATTORNEYS

INVENTORS
THOMAS O. HOLTEY
DONALD J. GREENWALD
BY Nicholas Prasinos
ATTORNEY

BRANCH FACILITY DIAGNOSTICS

BACKGROUND OF THE INVENTION

1. Field of the Invention

This invention relates generally to data processing apparatus and more particularly to improved diagnostic apparatus for detecting faults within a computer system.

2. Description of the Prior Art

Read only memories (ROMs) are in extensive use as control elements in a central processor in a computer and may be used to perform other functions such as, for example, address generation for all computer memories (main and control). They have evolved from the early 1950's when M. V. Wilkes (M. V. Wilkes, "The Best Way to Design an Automatic Calculating Machine," Manchester University Computer Inaugural Conference, July, 1951, pages 16–18) suggested a computer having a variable instruction set. Early computers provided a fixed set of instructions, each instruction comprised of a succession of elementary operations or micro-operations (micro-ops). The design of these early computers consisted of implementing the various micro-ops so that for each instruction available to the programmer the micro-op sequence was fixed in the computer hardware. By providing a machine with a variable instruction set, the micro programmer was able to vary the computer's instruction repertoire as the needs of his problem required by assembling the micro-ops into any instruction that the machine was capable of executing. These instructions could be varied by the micro programmer but generally not by the machine.

A computer having a variable instruction repertoire postulated the need for a memory to store the micro-op sequences, which memory could be altered by the micro programmer but not by the machine. The read only memory (ROM) or non-destructive readout memory evolved. Eventually the various control elements — those parts of a "digital computer which effect the carrying out of instructions in proper sequence, the interpretation of each instruction, and the application of the proper commands to the arithmetic element and other circuits" (IEEE Standards on Electronic Computers) — were centralized in the ROM element and its appurtenant hardware.

Typically a ROM is a rectangular memory array, having a capability of storing a plurality of words, each word comprised of a plurality of bits. Reduced to its simplest function 1 bit of a word generates one micro-op. The bits comprising a word are read out in parallel, and when simultaneously or sequentially executed under control of an external clock constitute a set of micro-ops. Different sequences of micro-ops when assembled into sets of micro-ops to define or execute some specified function such as, for example, extracting and executing normal program instructions, are termed a micro program. In order to effect economies in computer hardware and usage, micro programs are generally used in common by different machine instructions, by varying their sequence or parts thereof. Consequently, the utilization of a ROM as a control element involves considerable branching within the ROM in order to effect the variations in sequence of the micro-ops to be utilized during the processing of each program instruction. For this purpose a number of branching micro instructions together with subsidiary branching facilities are provided as part of the ROM micro instruction repertoire. Because it is imperative that the branching facilities of a machine operate reliably and that every bit of a micro instruction be faultlessly transferred and stored so that loss of control of the machine does not result, confidence testing and diagnosis of the ROM branching capabilities assumes prime importance.

Prior art techniques of detecting faults in a computer system takes several approaches. Chief among these approaches is some form of data comparison, wherein data is compared against some predetermined simulated or independently calculated expected result. Most confidence testing and diagnosis require a host of repetitive operations involving scanning, branching, storing, comparing and exiting operations.

One specific prior art technique for diagnosing faults in a ROM is described in a U.S. Patent to F. J. Hackl No. 3,343,141. Briefly this is a bit-by-bit sequential check of the ROM. In this mode of operation the main storage is used both as a source of data and control as opposed to the normal mode of operation wherein data is taken from the main storage to be placed in data paths, and control information is taken from the ROM and placed into decoders which in turn gate the data paths. The ROM array, its address register and memory local register is tested by an arrangement utilizing an all 1's tester and a single stage "binary trigger which can be repeatedly sequenced to test out a group of binary circuit elements one element at a time under the direction of program information stored in erasable store" (main memory).

Another prior art fault diagnosing technique is disclosed in a U.S. Patent to Thomas O. Holtey No. 3,518,413 wherein "the diagnostic apparatus effects testing of the processing of specified portions of a program instruction at predetermined points in time for determining whether sequencing has proceeded normally up to that point."

Still other prior art techniques utilize parity checking wherein a parity bit is provided or not in accordance with an odd or even parity checking scheme which detects whether or not a bit has been lost or gained in processing information.

Most of these schemes, however, require separate tests and/or apparatus to test the testing scheme and/or testing apparatus, which process could go on ad infinitum for obtaining a high degree of confidence in the equipment. Moreover prior art testing schemes of which the Applicants are aware do not check branching operations directly but indirectly as a result of the performance of other fault locating test.

SUMMARY OF THE INVENTION

Briefly the invention herein disclosed comprises a method and apparatus having an RIT flip-flop which when set modifies the operation of the halt "HLT" micro-op. The normal non-modified operation of "HLT" is to stop the computer clock. When the RIT flip-flop is set the "HLT" micro-op will not stop the clock, but any other micro instruction will stop the clock. Thus, if the RIT flip-flop is set by a micro instruction, the next micro instruction must be "HLT" in order for the machine to keep running.

The RIT flip-flop is set by three micro instructions:

a. store and branch "STOBRN" to location 0003 (octal);

b. store and branch "STOBRN" to location 7774 (octal); and c. "MAINTRA2R."

When any of these micro instructions are executed to the predetermined location, they must branch to a location containing a "HLT" micro-op. If there are no malfunctions in carrying out these micro instructions the machine continues to run, otherwise the machine halts, thus avoiding loss of control and identifying the error.

OBJECTS

It is an object therefore of the instant invention to provide an improved method and apparatus for diagnosis and confidence testing of branching capabilities in a computer system.

It is a more specific object of the instant invention to provide an improved method and apparatus for diagnosis and confidence testing of the ROM branching capabilities.

It is a further object of the instant invention to provide apparatus for verifying the accuracy of the branching capabilities of a computer system which is also inherently capable of testing its own accuracy.

It is another object of the instant invention to provide facilities for reducing, by provision of automated testing, the "hard-core" — that part of a system that must be debugged manually prior to automatic analysis of of other sections.

It is still another object of the instant invention to provide confidence and diagnostic test apparatus that is relatively simple and inexpensive to manufacture.

Other objects and advantages of the invention will become apparent from the following description of a preferred embodiment of the invention when read in conjunction with the drawings, contained herewith.

DESCRIPTION OF A PREFERRED EMBODIMENT

General

Figure 1:
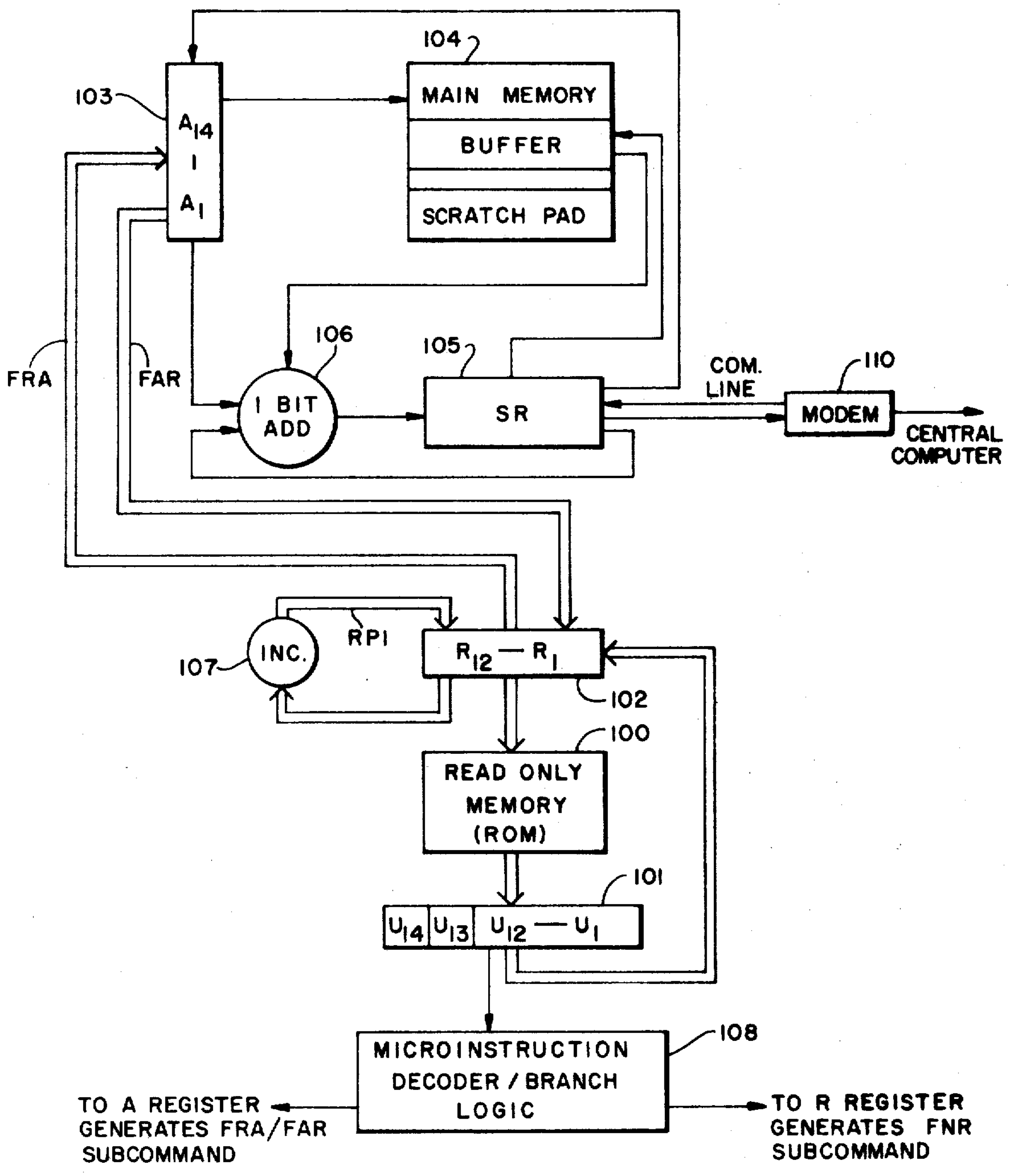
FIG. 1 is a block diagram of a system utilizing the invention.

FIG. 1 is a block diagram of an exemplary system utilizing the invention. The system architecture is that of a programmable terminal, however the invention may be utilized with other systems including a total computer system.

Figure 3:
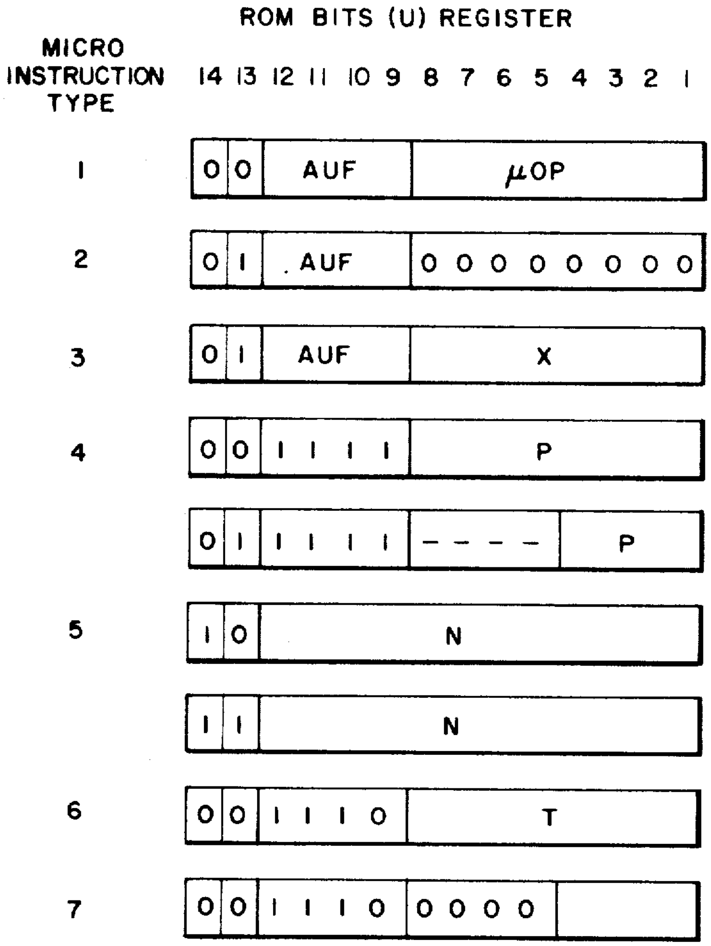
FIG. 3 illustrates the various micro instruction formats that the system is capable of utilizing.

Referring to FIG. 1 a read only memory (ROM) 100 provides control for the system. Various type of micro instructions with formates as shown on FIG. 3 are stored in the ROM 100. The micro instructions are read out into the U-register 101 where a parity check is performed on the 14 low order bits plus the high order (16th) parity bit when present. The 15th bit performs no normal control function but is used as a debugging feature of the invention (to be later more fully described) to halt the ROM sequencing at selected points in the micro program. Sequencing of the ROM 100 is generally performed by incrementing the R register 102 which is incremented by an incrementer 107 under control of the sub-command "RP1" to read out the next word in sequence from the ROM. There are two functions which alter this stepping of the ROM 100. One function is the test and skip logic (not shown) and the other function is the ROM branch facilities to be hereinafter more fully described.

Generally the branching facilities allow for a new address which is read out of the ROM to the U register 101 to be transferred to the R register 102. Briefly there are three types of branches — the basic branch which performs only the transfer of the contents of the U register 101 to the R register 102, the stored branch which performs the above mentioned transfer after the current address in the R register 102 is transferred to the A register 103 (the current address in this system is the address of the branch plus the increment), and a content swap of the A register 103 with R register 102.

The micro instruction read out into the U-register 101 is decoded by the micro instruction decoder and branch logic 108 which interprets the bit combination in the U-register as micro-ops and sub-commands. (For a fuller discussion of micro instruction decoding see page 467 of a book entitled "Digital Computer Design Fundamentals" by Yaohan Chu Published by McGraw Hill Book Company.)

The SR register 105 is the main working register and has many functions. For one it serves as the main memory local register through which information can enter or leave the main memory 104. A location addressed by main memory A address register 103 is read out into SR register 105, which information may be sent to modem 110 via communication lines, or may be further processed and returned to the main memory. Also a remote terminal may input information utilizing the communication lines and the SR register 105. The ! bit adder 106 under control of the AUF portion of the micro instruction, allows the SR register to be combined in various ways with data from, e.g., main memory.

The main memory 104 is functionally organized into two parts. The first 256 bytes are addressable by both the A register 103 and by an 8 bit parameter (not shown) specified by the read/write memory micro instruction. These 256 bytes are allocated for micro program use as a scratch pad memory for storage of various status bytes, counters, and registers. Additionally there are two sub-divisions within the scratch pad. The first 128 locations are allocated for the exclusive use of the micro program and the user of the program is prevented from using this area. The second 128 bytes are used as a communication area between the user of the program and the micro program. The remainder of the main memory 104 is for the use by the user program as buffers, instruction and other data.

The main memory 104 is addressed by main memory address register 103. The A register 103 can also receive information from SR register 105, or it can swap its contents with R register 102.

Branching within a ROM is performed by the micro instruction decoder and branch logic 108 (branching logic is well known in the art and need not be described herein in detail, see for example previous reference book by Chu). Branching by transferring the contents of the U-register 101 to the R register 102 is performed under the micro instruction BRN and the subcommand FNR. Branching by swapping the contents of the A-register 103 and R register 102 is performed by the micro instruction TRA2R or MAINTRA2R under the subcommands FAR and FRA.

Figure 2:
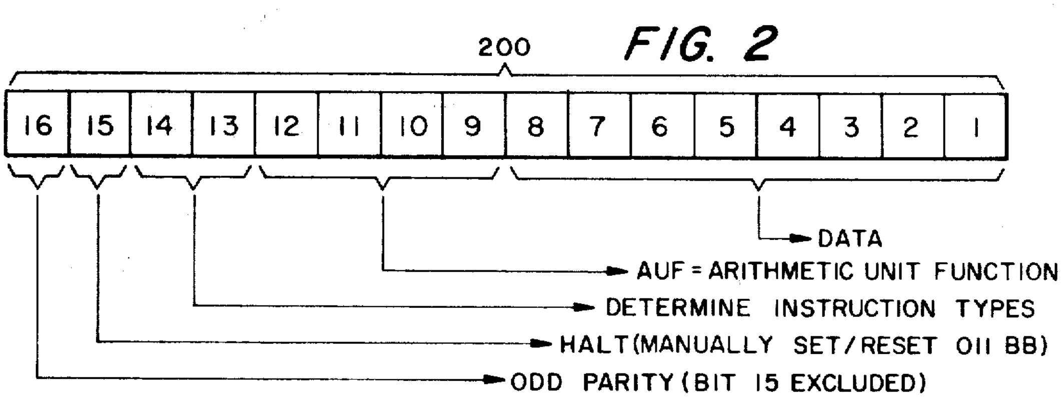
FIG. 2 illustrates the read only memory (ROM) word format, of a system utilizing the invention.

Referring now to FIG. 2 a ROM word 200 consists of 16 bits which are partitioned into different groups. The number of bits in any group depends on the function of the group. By decoding ROM bits, seven micro instruction types are generated (see FIG. 3) and can be expanded if new functions are needed.

The ROM word format 200 is sub-grouped as follows:

a. bit 16 is an odd parity bit (bit 15 excluded);

b. bit 15 is a halt bit (manually set/reset on bread board);

c. (bits 13, 14) determine the micro instruction types;

d. (bits 9–12) specify the arithmetic unit function (AUF);

e. (bits 1–8) specify the data bits on the micro-ops. (In BRN or STOBRN micro instruction bits 1–12 are the address.)

Referring now to FIG. 3 there is shown seven types of micro instructions as follows:

1. For type 1 micro instruction the micro-op field (bits 1 through 8) has control over most of the processor's data paths. Micro-ops of this type are divided into two categories — one to control data transfers among registers and within the registers such as increment or decrement the SR register; and the other category to provide 1½ micro second) pulses to various parts of the system such as for example read card pulses, set error flop, etc.

2. Types 2 and 3 micro instructions are distinguished by the fact that they operate upon data that is stored in some memory location and must tell the processor where the data is located in core memory so that the processor can find it.

3. Type 4 micro instruction is used to load a 1 byte parameter into a predetermined register.

Figure 4:
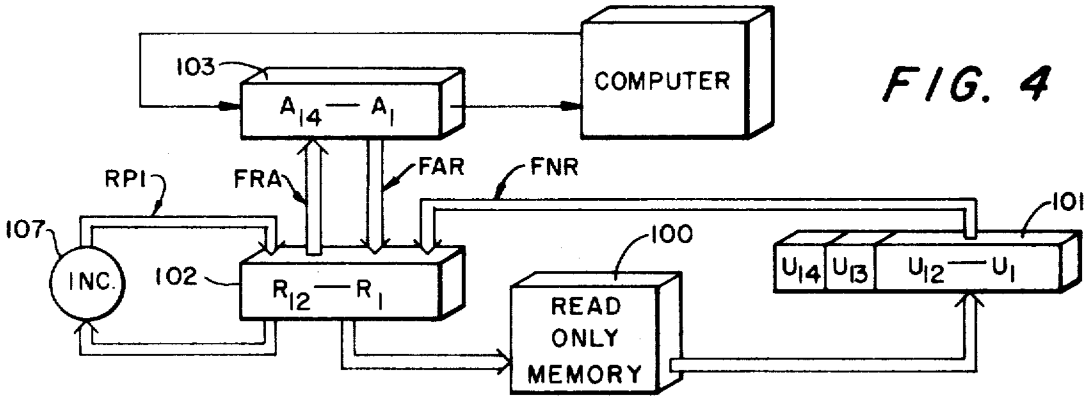
FIG. 4 is a block schematic diagram of the branch facilities of the invention.

4. Type 5 micro instruction is directly utilized in this invention and performs two functions:

a. Unconditional branch — branch to ROM address N. The mnemonic name for this micro instruction is BRN and is defined by bit 14 equal to 1 and bit 13 equal to 0. Under control of this micro instruction the contents of U-register 101 on FIG. 1 and FIG. 4 are transferred by sub-command FNR to R register 102, thus causing a simple branch.

b. Store and branch — first store the current address and branch to ROM address N. The mnemonic for this micro instruction is STOBRN and is defined by bit 14 equal to 1 and bit 13 equal to 1. Under control of this instruction the contents of R register 102 is first transferred to A register 103 under sub-command FRA and then the contents of U-register 101 are transferred to the R register 102 under sub-command FNR. This process causes the normal next address to be stored in A register 103, thus saving it for a subroutine return point or other uses. In order to return to the next succeeding instruction after a subroutine has been performed, an instruction called the TRA2R which is a type 7 micro instruction is used. It causes the contents of the R register 102 and the A register 103 to be swapped by simultaneously executing the subcommands FAR and FRA. (See FIG. 4.) Another version of the TRA2R instruction is the MAINTRA2R instruction which is also a type 7 micro instruction and differs from TRA2R micro instruction by having bit number 4 set.

When used in the diagnostic routine of this application any of these branch micro instructions when executed, are programmed to branch to a location containing a "HLT" micro instruction. (See FIG. 8.)

5. Type 6 micro instruction is used to test received I/O parity.

6. Type 7 micro instruction is used for example, to halt the ROM cycling or to give no operation order for debugging purposes and other purposes.

Included in the Type 7 micro instructions are the HLT, TRA2R, MAINTRA2R, and NOP to be more fully discussed below.

Referring now to FIG. 4 where the micro program branching facilities are illustrated in block form, a read only memory 100 has an address register R 102 and a read only memory local register U 101. Increment logic 107 associated with address register 102 adds 1 to the contents of R-register 102 under control of the subcommand RP1; consequently in the absence of a branch micro-op the next micro instruction in sequence is executed.

A register 103 is used as a working register vis-a-vis the branch facilities. The contents of A-register 103 may be transferred serially through the arithmetic unit of the computer to process its contents and/or store them in main memory, or it may be utilized simply as temporary storage.

Data paths and sub-commands which allow parallel data transfers among these registers are as follows:

a. The contents of U register 101 may be transferred in parallel to R-register 102 under the control of subcommand FNR;

b. the contents of the R register 102 may be transferred in parallel to A-register 103 under the control of sub-command FRA;

c. the contents of A-register 103 may be transferred in parallel to R-register 102 under the control of the sub-command FAR.

Moreover, ROM address register 102 addresses read only memory 100 and the contents from that address are transferred to U-register 101.

The hereinabove micro program branching facilities are used to implement three basic branching micro instructions. A type 5 micro instruction hereinbefore described in reference with FIG. 3 directs the carrying out of the function of branching and also of storing and branching. The branch micro instruction BRN is defined (as previously discussed) by having bit $U_{14}$ of register 101 set to 1 and by bit $U_{13}$ of register 101 set to 0. When this condition is true bits $U_{12}$-$U_1$ which are the contents of U-register 101 are transferred under sub-command FRN to R register 102, thus causing a simple branch.

The store and branch instruction STOBRN is defined when bits $U_{14}$ and $U_{13}$ of register 101 are set to 1. When this condition is true the current contents of R register 102 are first transferred in parallel under sub-command FRA to A register 103. The contents of U-register 101 are then transferred as previously discussed under sub-command FNR to R register 102. This instruction therefore causes the next address to be stored and saved in register 103 while a subroutine in the program is performed, and when the subroutine is finished the saved instruction address may be returned to R-register 102 for continuation of the program. This return from working register 103 to ROM address register 102 is effected under the control of the TRA2R instruction or the MAINTRA2R, which is a special version of the TRA2R instruction and differs from this instruction by having bit $U_4$ set to 1.

These instructions TRA2R and MAINTRA2R cause the contents of the A register 103 and R-register 102 to be swapped by simultaneously executing the sub-commands FAR and FRA.

When any of these micro instructions are executed, a branch is effected to a location containing halt "HLT." As will be more fully described subsequently if there are no faults the program continues to run; however if there are one or more faults the machine halts, thus avoiding loss of control and, identifying the error by means of the contents of the R register 102. The apparatus which modifies the "HLT" instruction so that it directs an operation opposite to its normal operation is shown on FIG. 5.

Figure 5:
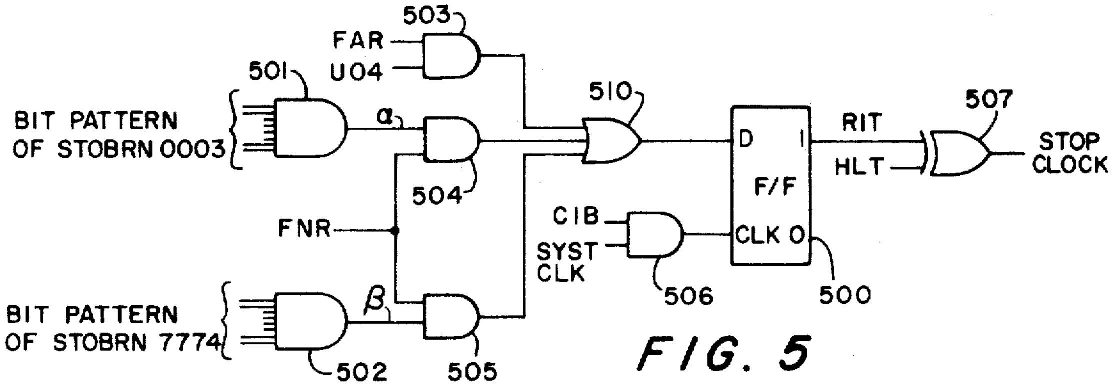
FIG. 5 is a logic block diagram of apparatus which modifies the operation of the "HLT" micro-op.

Referring now to FIG. 5, AND gates 501 and 502 have their input terminals coupled to U-register 101 (FIG. 4). The output terminal of AND gate 501 is coupled to an input terminal of AND gate 504, whereas the output terminal of AND gate 502 is coupled to an input terminal of AND gate 505. Also AND gates 504 and 505 have one input terminal each coupled to an FNR function generator (shown on FIG. 6 as AND gate 520). AND gate 503 has input terminals one of which is coupled to bit 04 of U-register 101 and the other coupled to a FAR function generator to be described infra. The output terminals of AND gated 503, 504, and 505 are coupled to the inputs of OR gate 510, whose output is coupled to the D terminal of flip-flop 500. (A typical flip-flop that may be used in the invention is a type SN7474 manufactured by Texas Instrument Incorporated, of Dallas, although other types may also be utilized.) The clock terminal of flip-flop 500 is coupled to the output terminal of AND gate 506, which has input terminals coupled to C1B and system clock pulse generators.

The SET or 1 terminal of flip-flop 500 is coupled to an input terminal of exclusive OR gate 507, whereas the other input terminal of exclusive OR gate 507 is coupled to a HLT function generator to be later described with FIG. 6. Finally the output of exclusive OR gate 507 is coupled to the system clock and stops the clock when its output is high.

The output $\alpha$ from AND gate 501 will be true when AND gate 501 is enabled. AND gate 501 is enabled when bits $U_{01}$, $U_{02}$, $U_{13}$ and $U_{14}$ are set or high and the rest are low, i.e. ($\alpha = U_{14} \cdot U_{13} \cdot \bar{U}_{12} \cdot \bar{U}_{11} \ldots \bar{U}_{03} \cdot U_{02} \cdot U_{01}$). AND gate 502 is enabled when all bits are set or high except $U_{01}$ and $U_{02}$ i.e. ($\beta = U_{14} \cdot U_{13} \cdot U_{12} \cdot U_{11} \ldots U_{03} \cdot \bar{U}_{02} \cdot \bar{U}_{01}$). Since the output signals $\alpha$ and $\beta$ are respectively ANDed with sub-command FNR responsive to pulse signal C1B, flip-flop 500 will be set when $\alpha$, or $\beta$, and FNR is true. Hence so far it is seen that when a STOBRN instruction is executed to either location 0003 or to locatIOn 7774 octal, flip-flop 500 is set and function RIT goes true. Since function RIT is exclusive OR'ed with the HLT function by exclusive OR gate 507, the clock will be stopped when either the RIT or HLT function is set but not both. On the other hand with the flip-flop 500 being set and with the RIT signal being high and HLT signal being also high, exclusive OR gate 507 will not be enabled when pulse C1B generates HLT during next micro instruction and hence the clock will not stop. It can now be readily appreciated that a store and branch STOBRN instruction to either octal location 0003 or 7774 will modify the next HLT micro-op. Since the normal operation of the HLT micro-op is to stop the machine clock, when flip-flop 500 is set so that signal RIT is high the HLT micro-op will not stop the clock, but any other micro instruction will stop the clock. The truth table below illustrates the various combinations of the HLT micro-op and RIT signal which will stop the clock or not.

TABLE I

| HLT | RIT | STOP CLOCK | TYPE OPERATION |
|---|---|---|---|
| 0 | 0 | 0 | normal run |
| 0 | 1 | 1 | error stop |
| 1 | 0 | 1 | normal halt |
| 1 | 1 | 0 | correct test — no stop |

Truth table I also shows that when both HLT and RIT are low the clock is not stopped; with HLT low and RIT high the clock stops; also with HLT high and RIT low there is a normal halt, i.e., the HLT micro-op has not been modified; with HLT high and RIT high we have a correct test and the modified HLT instruction is low, and does not stop the clock.

Figure 6:
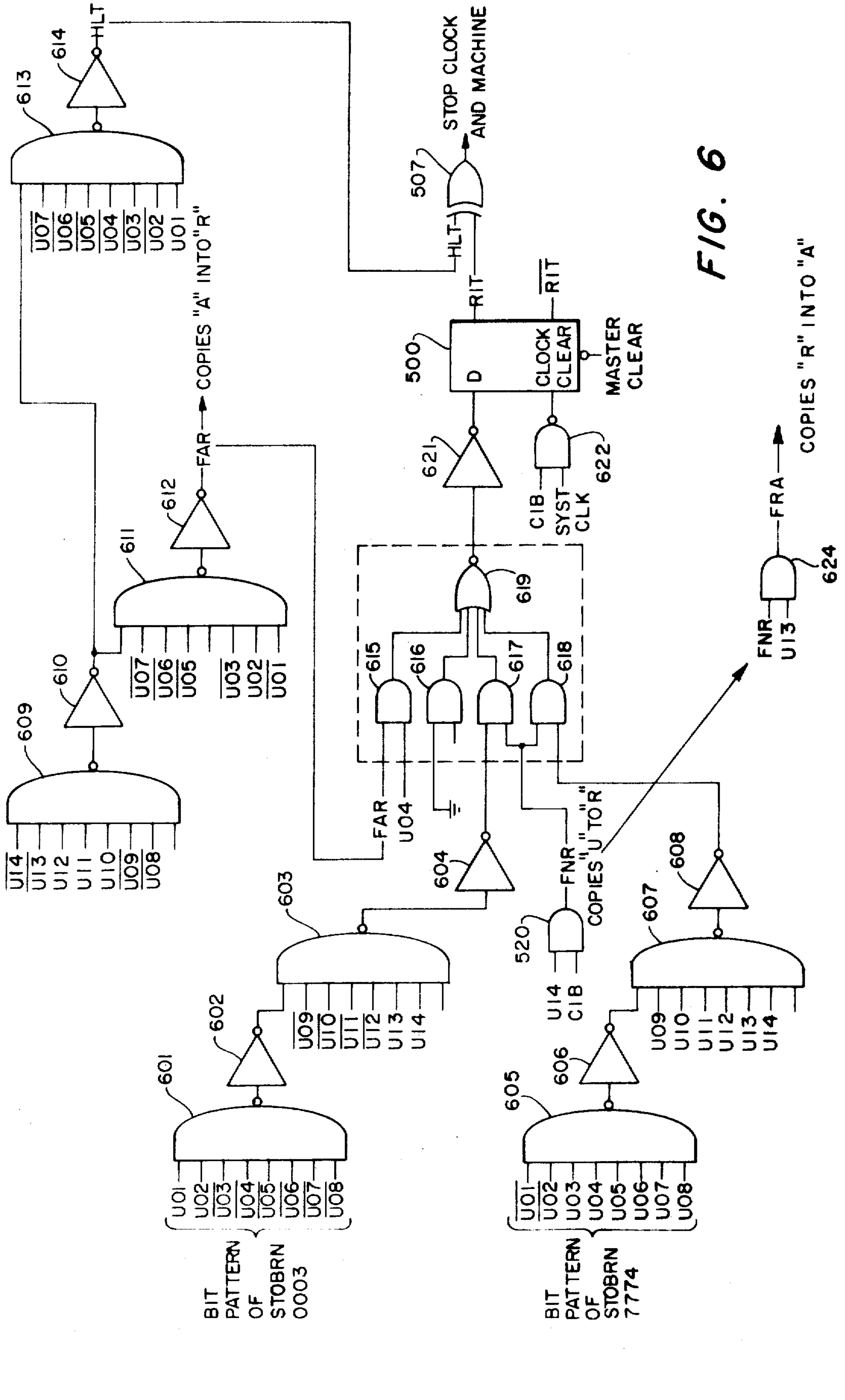
FIG. 6 is a more detailed logic block diagram of the invention.

Referring now to FIG. 6 NAND gates 601 and 605 each have their input terminals coupled to bits 1 through 8 of U-register 101; whereas each of their respective output terminals are coupled to inverters 602 and 606. NAND gates 603 and 607 have one terminal respectively coupled to the output terminal of inverter 602 and 608. Six of the input terminals of each of NAND gates 603 and 607 are coupled to bits 9 through 14 of U-register 101 whereas the remaining input terminals of each of eight legged NAND gates 603 and 607 are not utilized. The output of NAND gate 603 is coupled to the input of inverter 604 whose output terminal in turn is coupled to the input terminal of AND gate 617. The output terminal of NAND gates 607 is coupled to the input terminal of inverter 608 whose output terminal is in turn coupled to the input terminal of AND gate 618. AND gates 617 and 618 each have another of their input terminals ANDed to FNR generator AND gate 520. One of the input terminals of AND gate 520 is coupled to bit 14 of U register 101 whereas the other input terminal is coupled to C1B pulse generator. NAND gate 609 has seven of its eight input terminals coupled to bits 8 through 14 of U-register 101; it also has its output terminal coupled to the input terminal of inverter 610 whose output terminal in turn is coupled one each to an input terminal of NAND gates 611 and 613 respectively. NAND gate 611 has six of its input terminals coupled to bits 0 through 3 and bits 5 through 7 of U register 101; the UO4 terminal of NAND gate 611 is not utilized herein. This allows bit 4 as "don't care." The output terminal of NAND gate 611 is coupled to the input terminal of inverter 612 which in turn generates the FAR sub-command which is utilized to transfer the contents of the A-register 103 into the R-register 102. NAND gate 613 has seven of its input terminals coupled to bits 1 through 7 of U register 101; its output terminal is coupled to the input terminal of inverter 614 which in turn generates the HLT micro-op in response to a HLT micro instruction in U-register 101. AND gate 615 has its input terminal coupled to the FAR function generator whereas another of its input terminals is coupled to bit 4 of U-register 101; the output of AND gate 615 is coupled to an input terminal of NOR gate 619. AND gate 616 has one of its input terminals grounded and the other input terminal left floating e.g. logical 1.

The outputs respectively of AND gates 616, 617, and 618 aie coupled to input terminals of NOR gate 619. The output terminal of NOR gate 619 is coupled to the input terminal of inverter 621 whose output terminal is coupled to the D terminal of flip-flop 500. Flip-flop 500 is a MIL STANDARD "D" type flip-flop although other types may be utilized. This type of flip-flop has a clock input terminal which causes a flip-flop to change state upon the application of the positive going edge of a pulse signal. Coupled to the clock terminal of flip-flop 500 is the output terminal of NAND gate 622 whose input terminals are coupled to the C1B pulse generator (not shown) and system clock generator respectively. The SET or 1 terminal of flop-flop 500 generates the RIT function which is coupled to an input terminal of exclusive OR gate 507. The RESET or 0 terminal of flip-flop 500 generates the negated RIT function. EXCLUSIVE OR function 5)7 has another of its input terminals coupled to the HLT function generator 614. The output of EXCLUSIVE OR gate 507 is coupled to the system clock. AND gate 624 is FRA generator and permits the transfer of the contents of R register 102 into A register 103. Its input terminals are coupled to the FNR function generator and to bit 13 of U-register 101.

In operation gates 601, 602, 603, and 604 in combination create a logic signal which indicates that the current bit pattern in the U-register 101 is a STOBRN to location 0003 instruction. Similarly NAND gates 605, 606, 607 and 608 detect a STOBRN location 7774. When the outputs at inverter 604 and 608 are true there is an indication that one or the other of these micro instruction types exist in the U-register 101 at that time. AND gate 520 detects that a branch of either the stored branch or normal type branch is being called for and generates a sub-command FNR which when true permits the transfer of the contents of the U-register 101 into the R-register 102. The two AND gates 617 and 618 then AND the outputs of AND gate 520 with the outputs of inverters 604 and 608 respectively; these ANDed outputs are NORed together by NOR gate 619 and inverter 621. AND gate 615 which is also NORed by NOR gate 619 and inverter 621 detects the execution of a special TRA2R micro instruction which is utilized for the maintenance test. Bit 4 which is coupled to the output of AND gate 615 when true indicates the special TRA2R micro instruction. Gates 609, 610 coupled to the input of AND gate 615 through gates 611, 612 indicate that the micro instruction is a type 7 micro instruction by determining that bits 13 and 14 of U-register 101 are both zero and that the AUF bits 9, 10, 11 and 12 are a hexa-decimal E (1110).

The output signal from inverter 610 is utilized by two separate gates: one gate 611 decodes a portion of the U register 101 to indicate that the micro instruction is a TRA2R micro instruction or that the FAR is to be activated. Note that on gate 611 the 4th bit $U_4$ is not an input into the bit pattern and is not involved in the generation of the FAR function. The fourth bit of the U-register 101 is applied to the input of AND gate 615 to indicate that the operation is a maintenance type FAR function rather than a normal FAR function. Thus the output from inverter 621 backed up by gates 615 through 619 designates that one of the three maintenance type branch instructions are to be performed. Thus stored branch STOBRN to location 0003, or a STOBRN to location 7774, or a maintenance TRA2R when true will cause the RIT flip-flop 500 to set.

Gate 622 controls the clock input pulse for flip-flop 500. As has been previously mentioned flip-flop 500 is MIL STANDARD type D flip-flop which is constructed such that when a positive transition occurs at the output of gate 622 the current output of inverter 621, which is the D input to the flip-flop 500 is stored in the flip-flop until the next transition at gate 622. Thus once for each C1B cycle inverter 621 will be sampled to indicate whether the current instruction is of a maintenance branch type. When gate 621 is not true the RIT flip-flop will be reset at the next C1B cycle, thus causing it to be set for one micro instruction time and in effect modifying the next micro-op, in correct operation, a HLT. NAND gate 613 and inverter 614 are utilized to detect HLT micro instruction when present in the U-register 101. NAND gate 609 and inverter 610 detect the high order portion of the bit pattern within the U-register 101, thus determining type 7 i.e., bits $U_8$ through $U_{14}$. NAND gate 613 and inverter 614 detect the low order bit pattern of U register 101 for a total consideration of the entire pattern which represents a HLT micro-op. The HLT micro-op is true when bits $U_{01}$, $U_{10}$, $U_{11}$, and $U_{12}$ are high and the remaining bits are low.

When this bit pattern is present then a HLT micro-op is being executed.

The output from NAND gate 613 and inverter 614 is exclusive ORed with the RIT output of flip-flop 500 by EXCLUSIVE OR gate 507. Thus it is observed that if RIT flip-flop 500 is reset the output of gate 507 will be true when the HLT micro instruction is true but when the RIT flip-flop 500 is set, the output of gate 507 will be false and the HLT is true. This output is subsequently applied to the flip-flop (not shown) which will control the running of the system clock and cause it to stop the clock when true, thus accomplishing the maintenance test purposes outlined in Table 2 and further described in reference with FIG. 8.

AND gate 624 generates the FRA sub-command which permits the transfer of the contents of the R-register 102 into the U-register 101 when the micro instruction is a stored branch, which is performed by ANDing the FNR function with the 13th bit of the U-register being true.

Figure 7:
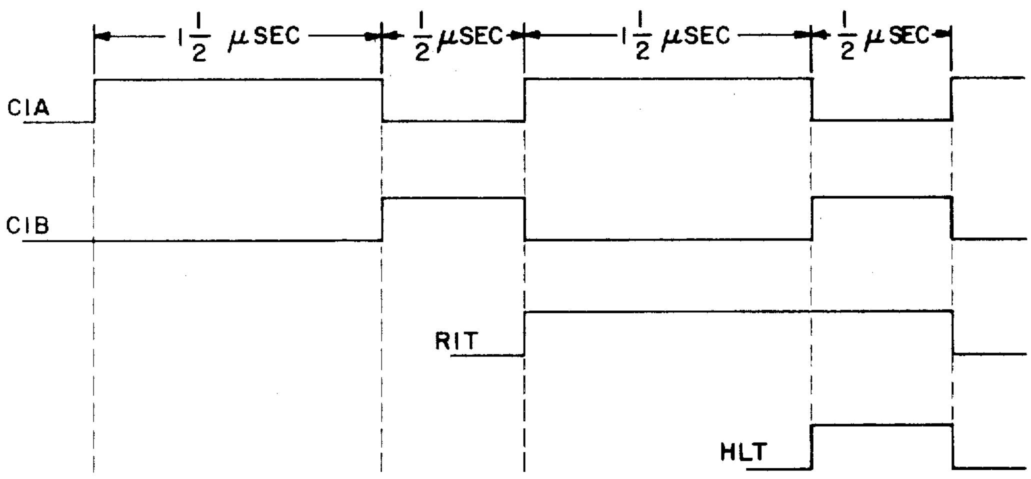
FIG. 7 is a timing diagram showing the sequencing of different states of the invention.

Referring to FIG. 7 a timing diagram (not to scale) is shown that sets forth the sequence of fetch, execute, set RIT flip-flop and HLT. C1A illustrates the fetch cycle when the U register 101 receives data from a location in the ROM which is addressed by R-register 102. This cycle is substantially 1½ micro seconds although other time periods may be utilized. The C1B cycle or pulse signal is about ½ micro second and is the actual time when the contents of register 101 is transferred to register 102 when executing a BRN micro instruction under a sub-command FNR or when transferring the contents of register 102 to register 103 under sub-command FRA and subsequently transferring the contents of register 101 to register 102 under sub-command FNR; or finally when swapping the contents of register 102 with 103 by micro instruction TRA2R or MAINTRA2R under sub-commands FRA and FAR. After the execution of any of the branch micro instructions to octal location 0003 or 7774 flip-flop 500 is set and function RIT goes high and remains high until the next executed sub-command. Finally a HLT micro-op will occur when present during an execute cycle.

Figure 8:
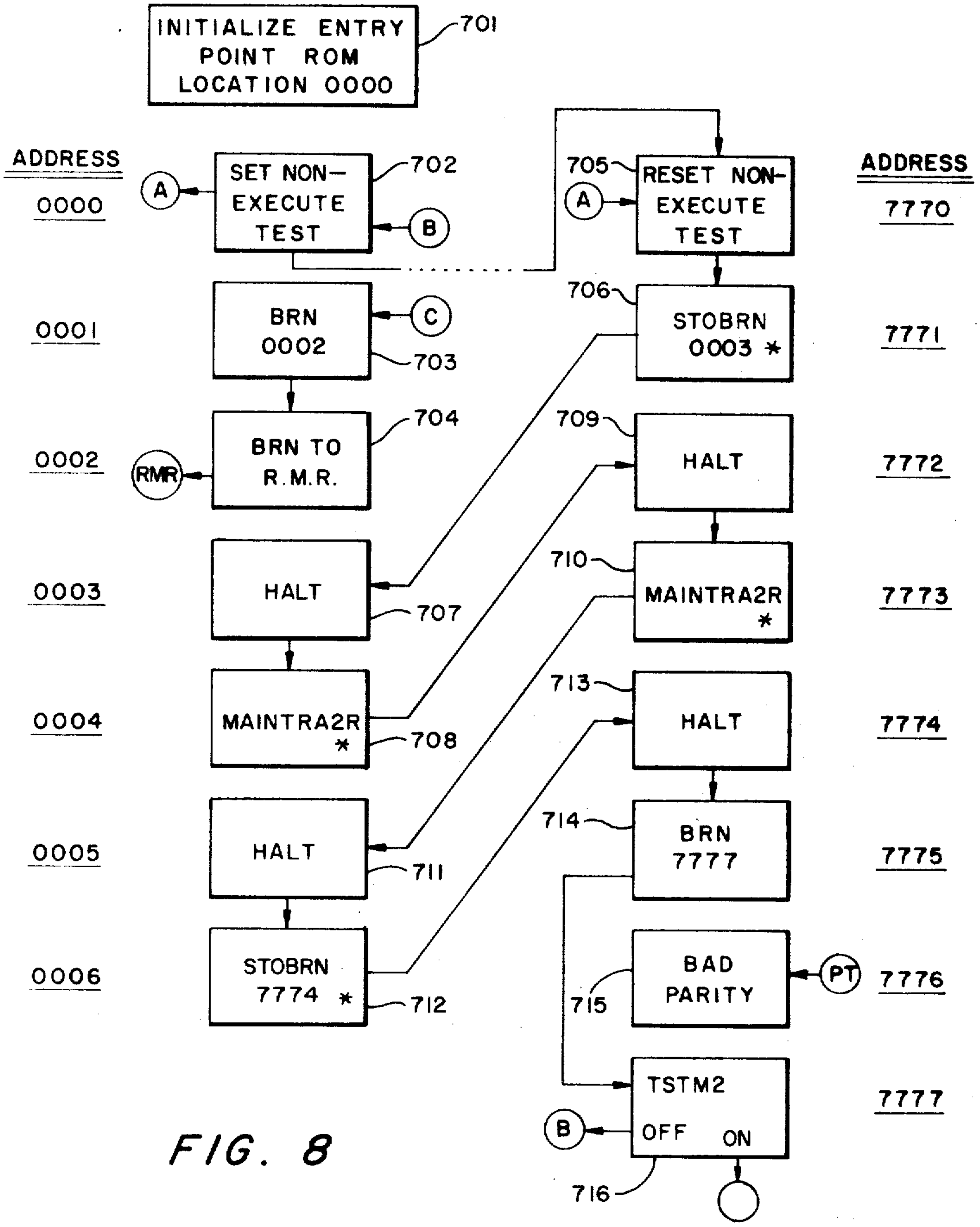
FIG. 8 is a flow chart of the confidence and diagnostic test procedure.

FIG. 8 shows a flow diagram of a scan test and the branch facility test. First the ROM stored locations from octal 0000 to 7770 are tested for parity and then octal locations 7771 through 7774 and 0003 through 0006 are utilized to test the branch facilities of the system. The system is initialized by forcing the R-register 102 to location 0000, block 701; at ROM address 0000 there is a micro instruction which sets a non-execute test, block 702. During this non-execute test, R register 102 addresses each ROM location from octal 0000 through octal 7770, block 702 – block 705. As each ROM location is addressed by register 102, the contents of that location are read out into U-register 101 whereupon a parity check is performed upon the contents but no sub-command or execute order is given. When ROM location 7770 is reached the non-execute test is reset 705. From this step onward the machine will not only fetch an instruction into the U-register 101 but it will also execute it. The next location 7771 of ROM 100 contains a micro instruction STOBRN 0003 which is a store and branch instruction to octal location 0003. When R register 102 addresses location 7771, block 706, there will be a branch to location 0003, block 707. Thus if the STOBRN instruction was properly executed and a branch is made to location 0003, flip-flop 500 of FIG. 5 will be set which in turn sets the RIT function (see FIGS. 6 + 7). At location 0003, block 707, there is HLT micro-op; the normal function of the HLT micro-op is to halt the machine; however since flip-flop 500 has modified this micro-op by setting the RIT function the machine will continue to run, indicating that the STOBRN micro instruction was properly carried out. If, for example, there was no branch to location 0003 when such a branch was called for by the STOBRN micro instruction in location 7771, register 102 would be incremented to octal location 7772 where there is also a HLT micro instruction 709; however in this instance flip-flop 500 would not set the RIT function since that function is set by a predetermined bit pattern and sub-command FNR in STOBRN to either location 0003 or 7774 as discussed supra, and therefore for this condition the machine would halt indicating a fault in branching. Upon the successful completion of a branch from location 7771 to location 0003, block 706 to 707, the ability of data path U to R, from register 101 to 102, has been tested for carrying mostly zeros. ROM address register 102 will then address ROM location 0004, block 708, where there is a special form of the TRA2R micro instruction or the MAINTRA2R micro instruction. The MAINTRA2R micro instruction when executed swaps the contents of the A-register 103 with the contents of the R register 102. However since in the execution of the previous STOBRN micro instruction of block 706 the R register 102 was first incremented to octal address 7772 which was then stored temporarily in A register 103 prior to the transfer of the contents of the U-register 101 to R register 102, the execution of the MAINTRA2R micro instruction will bring back from A register 103 the address 7772 stored in it and place it in R register 102, whereupon the contents of the R-register 102 will be placed into the A-register 103. With ROM address register 102 now containing the address 7772 a branch will be forced from location 0004 to location 7772, block 708 to block 709. Again the RIT function is set and since there is a HLT micro-op at location 7772 the machine will continue running if the transfer is executed properly and the micro program will continue to block 710, when the R register 102 is incremented to address 7773. At address 7773 there is another MAINTRA2R micro instruction which again causes the A-register 103 and R-register 102 to swap contents. This will bring the address of ROM location 0005 to R register 102 which will readout a HLT micro instruction into U-register 101 which was located at ROM location 0005. Since the RIT function of flip-flop 500 was set upon the execution of the MAINTRA2R micro instruction and the HLT micro-op was modified the micro program will continue to the next location 0006, block 711 to 712, and not stop the machine. ROM location 0006 contains a STOBRN micro instruction which is read out into U-register 101 which is decoded and executed by transferring the contents of the U-register which is the address 7774 to the R-register 102. (Block 712 to block 713.) After the execution of the STOBRN micro instruction the RIT function is set. Location 7774 contains a HLT micro instruction which when read out into register 101 and decoded permits the machine to run, because the RIT function is set. The next ROM location address is 7775, block 714, where there is a branch (BRN) micro instruction which causes the machine to branch to the last ROM location 7777. (Location 7776 is a location reserved for checking bad parity and is bypassed on this test.) The last location, block 716, tests one of the maintenance switches which indicates whether this routine should be performed again or else go to other diagnostics. If the switch is off, the ROM address register 102 is incremented by 1 which brings the test routine back to location 0000. And thus the non-execute test is set again and performed all over again. If the test switch is a 1 the ROM address register is incremented once for normal or because the test is valid, and the program is forced to ROM location 0001 or block 703, which in turn has a branch to locations 0002. The branch is executed and the program branches out of this test sequence to other diagnostics.

Table II below shows the various states of the R-register and A-register and the various transfers under the influence of various micro instructions, and also shows the capability of the machine that is tested.

7773 which issues another MAINTRA2R micro instruction which swaps the contents of the A and R-registers. The A-register 103 still has the address location 0005. Upon execution of the MAINTRA2R micro instruction data pattern 0005 contained in the A-register is transferred to the R-register. This procedure tests the capability of transferring the data pattern 0005 from A to R and the data pattern 7772 from R to A (note that

TABLE II

| Step | "R" before | Micro instruction | "A" before | Significant actions | Tested capability |
|---|---|---|---|---|---|
| 1 | 7771 | "STOBRN" 0003 | | 0003 transferred from U to R 7772 transferred from R to A | U to R transfer of 0003 Branch decode (if "FNR" is not decoded machine will HALT at 7772). If "RIT" did not set machine will HALT at 0003. |
| 2 | 0003 | "HLT" | 7772 | | |
| 3 | 0004 | "MAINTRA2R" | 7772 | 7772 transferred from A to R 0005 transferred from R to A | R to A and A to R transfer of 7772 Decode of "TRA2R" (if "FAR" is not decoded machine will HALT at 0005). |
| 4 | 7772 | "HLT" | 0005 | | |
| 5 | 7773 | "MAINTRA2R" | 0005 | 0005 transferred from A to R | R to A and A to R transfer of 0005 (note—this is complement of 7772). |
| 6 | 0005 | "HLT" | 7774 | | |
| 7 | 0006 | "STOBRN" 7774 | 7774 | 7774 transferred from U to R | U to R transfer of 7774 (note—this is complement of 0003). |
| 8 | 7774 | "HLT" | 0006 | | |

Step 1 of Table II is located at block 706 of FIG. 7 or at ROM location 7771. The R register 102 contains the address 7771 which is the incremented address of where the reset non-execute test instruction was before commencing the branch facility testing. Hence, after the non-execute test was reset block 705 of FIG. 7, address 7770 was incremented to 7771 which contains the micro instruction STOBRN 0003. The previous state of the A-register 103 is not known. Upon execution of the STOBRN micro instruction, the contents 7772 of R-register 102 is first transferred to A register 103 and the contents of the U-register 101 which now contains the address 0003 is transferred to R-register 102. This tests the transfer of the data pattern 0003 or mostly zeros from U-register 101 to R-register 102. It also tests the branch decode micro-op FNR since this micro-op is used to transfer the 7772 data. Moreover if RIT did not set, the machine will halt at 0003 because the R-register 102 did not increment. (This is a form of a self check on the checking apparatus.)

Step 2 shows that a HLT micro instruction is located at ROM location 0003, and that A-register 103 now contains address 7772.

In step 3 the machine has incremented from ROM location 0003 to ROM location 0004 which contains a MAINTRA2R micro instruction, and the A register 103 still contains address 7772. Upon execution of this instruction the data pattern 7772 is transferred from A-register 103 to R-register 102 and the incremented contents of R-register 102 which is 0005 is transferred to A-register 103. This procedure effectively swaps the contents of the A and R-registers. This instruction tests the R to A and A to R transfer of data of the code 7772 or mostly 1's. And it also sets up the transfer path of the code 0005. Moreover this instruction test the FAR subcommand since if the instruction TRA2R is decoded and the FAR is not set, the machine will halt at location 0005. FAR is used to set RIT. If FAR does not set, the HLT in location 0005 will stop the clock. (R-register increments but no transfer A to R.)

Step 4 shows the R-register 102 containing the data pattern 7772 which is an address wherein a HLT micro-op resides, and it shows register 103 containing the data pattern 0005.

In step 5 the R-register 102 has been incremented to these data patterns are complementary one to the other in octal).

Step 6 shows the result of the above transfer wherein R-register now contains the data pattern 0005 and A-register contains the data pattern 7774 which is the incremented data pattern of 7773. In ROM location 0005 addressed by R-register 102 is the HLT micro instruction.

Step 7 shows that the R-register has the pattern 0006 which will issue a STOBRN store and branch micro instruction to location 7774 which is a complement of the data pattern 0006. The A register has the data pattern 7774. Upon execution of the micro instruction STOBRN the data pattern 7774 is transferred from U-register to R-register. (Transfers between A-register to R-register and R-register to A-register with complemented data patterns are complete. The only test left to do is the U-register to R-register transfer of data patterns 7774 to complement data pattern 0003 (step 1). It is a fallout of the test that A-register has data pattern 7774 stored in it.)

It will be apparent from the foregoing disclosure of the invention that numerous modifications, changes and equivalents will now occur to those skilled in the art, all of which fall within the true scope contemplated by the invention.

What is claimed is:

1. An electronic data processing control element having a micro instruction modifying system for generating in an unmodified state a first type micro-op signal for controlling a predetermined micro operation, said first type micro-op signal generated in response to a first type micro instruction signal having a first predetermined pattern of bits, and in a modified state said modifying system generating a second type micro-op signal for controlling said predetermined micro operation, said second type micro-op signal generated in response to any modified first type micro-op signal in response to a micro instruction signal having any pattern of bits other than said first predetermined pattern of bits, said unmodified first type micro-op signal and said second type micro-op signal for controlling the same operation, said control element comprising:

a. a first generating means responsive to said first type micro instruction having said first predetermined pattern of bits for generating said unmodified first type micro-op signal;

b. modifying means responsive to any of a predetermined set of branching micro instruction signals for providing at least one modifying signal;

c. and second generating means coupled to said first generating means and to said modifying means for generating said second type micro-op signal in response to said modifying signal and to said unmodified first type micro-op signal.

2. A micro instruction modifying system as recited in claim 1 wherein said generating means is responsive to a halt (HLT) micro instruction having said predetermined pattern of bits for generating a half (HLT) micro-op signal.

3. A micro instruction modifying system as recited in claim 1 wherein said first type micro-op signal is a "-halt" for halting the execution of a micro program then under execution.

4. A micro instruction modifying system as recited in claim 1 wherein said predetermined set of branching micro instruction signals are selected from the group consisting of "MAINTRA2R" and "STOBRN."

5. A micro instruction modifying system as recited in claim 4 wherein said predetermined set of branching micro instruction signals call for a branch to one of two complementary ROM locations "0003" or "7774" (octal).

6. A micro instruction modifying system as recited in claim 1, wherein said modifying means comprise a flip-flop, AND gates and NAND gates said AND gates exclusive OR coupled together and with predetermined ones of said NAND gates serially coupled to each other, and having predetermined ones of said serially coupled NAND gates coupled to predetermined ones of said AND gates, and the operation of said generating means is modified by setting the flip-flop.

7. A micro instruction modifying system as recited in claim 1 including sub-command generating means coupled to said signal enabling means for generating sub-commands for controlling branching of the branching micro instruction signals.

8. A micro instruction modifying system as recited in claim 7 wherein said sub-command generating means generate the sub-command signals FNR, FAR, and FRA for controlling the branching of MAINTRA2R and STOBRN micro instruction signals.

9. A micro instruction modifying system as recited in claim 8 wherein said modifying system includes a read only memory (ROM), and coupled to said ROM further includes an address register and a local register.

10. A micro instruction modifying system as recited in claim 9 wherein said signal enabling means provides two enabling signals $\alpha$ and $\beta$.

11. A micro instruction modifying system as recited in claim 10 wherein $\alpha$ is true when the following Boolean expression is true;

a. $\alpha = U_{14} \cdot U_{13} \cdot \overline{U}_{12} \cdot \overline{U}_{11} \cdot \overline{U}_{10} \cdot \overline{U}_{09} \cdot \overline{U}_{08} \cdot \overline{U}_{07} \cdot \overline{U}_{06} \cdot \overline{U}_{05} \cdot \overline{U}_{04} \cdot \overline{U}_{03} \cdot U_{02} \cdot \overline{U}_{01}$, and $\beta$ is true when the following Boolean expression is true;

b. $\beta = U_{14} \cdot U_{13} \cdot U_{12} \cdot U_{11} \cdot U_{10} \cdot U_{09} \cdot U_{08} \cdot U_{07} \cdot U_{06} \cdot U_{05} \cdot U_{04} \cdot U_{03} \cdot \overline{U}_{02} \cdot \overline{U}_{01}$, and wherein $U_n$ represents ROM bit positions of the U-register.

12. In combination with a ROM system having an address register, a ROM local register, a micro instruction decoder and a working store register a diagnostic system for confidence testing of ROM branching capabilities of a computer system comprising:

a. generating means for generating in response to a halt HLT micro instruction signal a halt (HLT) micro-op signal for causing a computer program to halt;

b. predetermined storage locations in said ROM for storing at least one of the HLT micro instructions;

c. enabling means responsive to a first predetermined set of branch micro instructions, said first predetermined set of micro instructions calling for a branch to predetermined ones of said predetermined ROM storage locations, said modifying means for generating an enabling signal.

13. A diagnostic system for confidence testing as recited in claim 12 wherein said predetermined storage locations are ROM storage locations and a HLT micro instruction is stored in said predetermined ROM locations.

14. A diagnostic system for diagnosis and confidence testing of ROM branching capabilities of a computer system comprising:

a. a computer read only memory (ROM) for storing micro instructions;

b. a working store register coupled to said ROM;

c. a ROM address register coupled to said ROM and to said working store register;

d. a ROM local register coupled to said ROM, to said ROM address register and to said micro instruction decoder;

e. branch logic means coupled to said ROM local register, ROM address register and working store register, said branch logic means for controlling the branching of a branch micro instruction;

f. first means coupled to said ROM local register and responsive to a first predetermined pattern of bits in said ROM local register for generating a HALT micro-op for effecting upon execution the halting of said computer;

g. second means coupled to said ROM local register and responsive to a second predetermined pattern of bits in said ROM local register for generating a FAR sub-command signal;

h. third means coupled to said ROM local register and responsive to a third predetermined pattern of bits for generating an FNR sub-command signal;

i. fourth means coupled to said ROM local register and responsive to a predetermined bit in said ROM local register and to said FNR sub-command for generating a FAR sub-command signal;

j. fifth means responsive to a fifth predetermined pattern of bits in said ROM local register for generating a first modifying signal; and k. sixth means responsive to said modifying signal for modifying said HLT micro-op signal, said modification for effecting, upon execution of said HLT micro-op signal, the continued running of said computer wherein said FAR sub-command signal controls the transfer of the contents of the working store register to the address register, and said FNR sub-command signal controls the transfer of the contents of the local register to the address register.

15. In combination with the read only memory system (ROM) a method for confidence testing of ROM branching capabilities of a computer system comprising the steps of:

a. storing a halt (HLT) micro instruction in first and second predetermined locations of said ROM, said HLT micro instruction for generating a HLT micro-op for halting a computer micro program running on said computer systems;

b. modifying the HLT micro-op in response to a store and branch (STOBRN) micro instruction calling for a branch to one of said first predetermined locations, whereupon said modified HLT micro-op permits upon execution, the micro program to continue to run;

c. branching to one of said first predetermined locations in response to the STOBRN micro instruction;

d. and executing the modified HLT micro-op whereupon the micro program continues to run.

16. A method as recited in claim 15 whereupon the execution of a modified HLT micro-op the micro program continues to run and a next MAINTRA2R micro instruction is fetched and executed, said MAINTRA2R micro instruction modifying the HLT micro-op, and also effecting a branch to another of said first predetermined locations.

17. In combination with a read only memory system (ROM) having signal modifying means a method for confidence testing of ROM branching capabilities of a computer system comprising the steps of:

a. allocating storage locations in a ROM for storing micro instructions therein;

b. storing in predetermined ones of said storage locations a halt (HLT) micro instruction, which when executed halts the further execution of a micro program;

c. storing in the remaining of said allocated storage locations, branch micro instructions selected from a predetermined set, said branch micro instructions calling for a branch to one of said predetermined locations containing a HLT micro instruction, said branch micro instruction also capable of effecting the modification of the halt (HLT) micro instruction so that upon execution of the HLT micro instruction the further execution of the micro program continues;

d. executing the first branch micro instruction stored in a first one of said remaining allocated storage locations, said branch micro instruction calling for a branch to a first one of said predetermined storage locations storing a HLT micro instruction;

e. modifying in response to the first branch micro instruction, the HLT micro instructions stored in said first one of said predetermined storage locations storing a HLT micro instruction, so that upon execution of said HLT micro instructions stored in said first one of said predetermined storage locations, the further execution of the micro program continues;

f. branching in response to the first branch micro instruction, to said first one of said predetermined storage locations storing a HLT micro instruction; and g. executing said HLT micro instruction stored in said first one of said predetermined storage locations storing a HLT micro instruction, whereupon with the execution of said HLT micro instruction, the micro program continues to run.

18. A method as recited in claim 17 wherein branching in response to the first branch micro instruction fails to occur and the execution of said HLT micro instruction stored in said first one of said predetermined storage locations does not take place, whereupon an unmodified HLT micro instruction stored in a second one of said predetermined storage locations is executed causing the micro program to halt.

19. A method as recited in claim 17 wherein a MAINTRA2R micro instruction is stored in said first one of said remaining allocated storage locations.

20. In combination with a read only memory system (ROM) a method for confidence testing of ROM branch capabilities of a computer system comprising the steps of:

a. allocating in a ROM, storage locations 0003, 0004, 0005, 0006 and their respective complementary locations 7771, 7772, 7773, and 7774 for storing predetermined micro instructions therein;

b. storing predetermined micro instructions in said locations in accordance with the following Table I;

Table I

| ROM Location | Micro Instruction Stored |
|---|---|
| 0003 | HALT |
| 0004 | MAINTRA2R |
| 0005 | HALT |
| 0006 | STOBRN 7774 |
| 7771 | STOBRN 0003 |
| 7772 | HALT |
| 7773 | MAINTRA2R |
| 7774 | HALT |

α. wherein MAINTRA2R is a branch micro instruction for branching back to an original micro program and is capable of modifying a HALT micro instruction so that the HALT micro instruction that is modified effects the continued running of the micro program;

β. and wherein a STOBRN is a branch micro instruction calling for a branch of the micro program to any ROM location and moreover when a branch is called for to location 0003 or 7774 said STOBRN is capable of modifying the HALT micro instruction so that the micro instruction that is modified effects the continued running of the micro program;

γ. and wherein the HALT micro instruction not modified by another micro instruction is capable of effecting the halting of the micro program;

c. executing the STOBRN micro instruction stored in ROM location 7771, said execution causing a branch to location 0003 and modifying said HALT instruction stored in location 0003;

d. executing said modified HALT instruction stored in ROM location 0003, said execution causing the micro program to continue to the next ROM location 0004 storing a MAINTRA2R micro instruction;

e. executing said MAINTRA2R micro instruction stored in location 0004, said execution causing a branch back to location 7772 and also modifying said HALT instruction stored in location 7772;

f. executing said modified HALT instruction stored in ROM location 7772, said execution causing the micro program to continue to the next ROM location 7773 storing a MAINTRA2R micro instruction;

g. executing said MAINTRA2R micro instruction stored in location 7773, said execution causing a branch back to location 0005 and also modifying said HALT micro instruction stored in location 0005;

h. executing said modified HALT instruction stored in ROM location 0005, said execution causing the micro program to continue to the next ROM location 0006 storing a store-and-branch to location 7774 (STOBRN 7774) micro instruction;

i. executing said STOBRN 7774 micro instruction, said execution causing a branch to location 7774 and also modifying the HALT micro instruction stored in location 7774;

j. and executing said modified HALT micro instruction stored in ROM location 7774, said execution causing the micro program to continue to the next ROM location.

21. An electronic data processing control element having an instruction modifying system for generating in an unmodified state a first type signal for controlling a predetermined operation, said first type signal generated in response to a first type instruction signal having a first predetermined pattern of bits, and in a modified state said modifying system generating a second type signal for controlling said predetermined operation, said second type signal generated in response to any modified first type signal in response to an instruction signal having any pattern of bits other than said first predetermined pattern of bits, said unmodified first type signal and said second type signal for controlling the same operation, said control element comprising:

a. a first generating means responsive to said first type instruction having said first predetermined pattern of bits for generating said unmodified first type signal;

b. modifying means responsive to any of a predetermined set of branching instruction signals for providing at least one modifying signal;

c. and second generating means coupled to said first generating means and to said modifying means for generating said second type signal in response to said modifying signal and to said unmodified first type signal.

* * * * *